United States Patent [19]

Gosset

[11] 3,846,758

[45] Nov. 5, 1974

[54] ELECTRONIC KEYBOARD INCLUDING PROGRAM MEMORY MEANS AND PROGRAM SELECTING MEANS

[75] Inventor: Cyrille Gosset, Danjoutin, France

[73] Assignee: Societe Industrielle Honeywell Bull. (Societe Anonyme), Paris, France

[22] Filed: June 28, 1972

[21] Appl. No.: 266,894

[30] Foreign Application Priority Data

June 30, 1971 France ............................ 71.23931

[52] U.S. Cl. ................................ 340/172.5, 197/71

[51] Int. Cl. ............................................ B41j 25/24

[58] Field of Search .................... 199/1, 18; 197/71; 340/172.5, 347; 235/145, 146; 178/17

[56] References Cited

UNITED STATES PATENTS

| | | | |
|---|---|---|---|
| 3,283,873 | 11/1966 | Robinson | 197/71 |
| 3,288,261 | 11/1966 | Hoiseth et al. | 197/71 |
| 3,441,671 | 4/1969 | Hennig | 178/17 C |
| 3,524,527 | 8/1970 | Davidge | 197/71 |
| 3,526,892 | 9/1970 | Bartlett et al. | 178/17 C X |
| 3,586,148 | 6/1971 | Jacobson et al. | 178/17 C X |
| 3,592,313 | 7/1971 | Castle et al. | 197/71 |
| 3,623,588 | 11/1971 | Prodan | 178/17 C X |
| 3,643,254 | 2/1972 | Proebsting | 178/17 C X |
| 3,644,888 | 2/1972 | Marino | 178/17 R X |

*Primary Examiner*—Gareth D. Shaw
*Assistant Examiner*—Paul R. Woods
*Attorney, Agent, or Firm*—Fred Jacob; Ronald T. Reiling

[57] ABSTRACT

An electronic data entry keyboard is disclosed which provides for the local encoding of the characters appearing on the keys. The coding involves characterizing the characters as to whether they are upper case or lower case characters. This is done through the depression of certain specially assigned keys on the keyboard. These specially assigned keys can interrupt the internal data processing within the keyboard.

12 Claims, 5 Drawing Figures

| Cs | Pr | $\tau\alpha$ | $\tau\nu$ | |
|---|---|---|---|---|
| 0 | 0 | 0 | 0 | A |
| 1 | 1 | 0 | 0 | B |
| 0 | 0 | 1 | 0 | C |
| 1 | 0 | 0 | 1 | D |
| 0 | 1 | 1 | 0 | E |
| 1 | 1 | 0 | 1 | F |
| 0 | 0 | 1 | 1 | G |
| 1 | 1 | 1 | 1 | H |

ELECTRONIC KEYBOARD INCLUDING PROGRAM MEMORY MEANS AND PROGRAM SELECTING MEANS

BACKGROUND OF THE INVENTION

The present invention concerns an electronic keyboard which may be used in a device for entering coded data into a data processing system.

In a great number of data processing systems, provision is frequently made for the user to directly intervene with the computer when it is operating. A practical and flexible form intervention into a data processing system is the numeric or alphanumeric keyboard. This data entry device codes the data and transmits the coded data to the central processing unit of the computer.

Such keyboards are known. In one of these, the keys are integral with the activating bars which are in turn above and perpendicular to the coding bars. These activating bars are set in motion in such a way as to depress a coding bar which in turn engages an intermediary part. The intermediary part is housed in a groove which also contains a mobile armature of an electromagnet. The mobile armature when excited by the intermediary part controls the closing of electrical contacts in accordance with the coded combination.

These electromechanical keyboards are rugged and reliable performers, but have the drawback of being space consuming and having too long a response time. It is for this reason that they are being more and more replaced by keyboards with electronic control, termed "electronic keyboards." When a key is depressed in one of the known electronic keyboards, electrical signals are sent over several different channels that lead to a coding stage of a data entry device in the central unit of the computer. Such a keyboard does not require much space, provides for flexible use and has a short response time.

Electronic keyboards present one major disadvantage. This disadvantage arises out of the fact that the choice between the lower case character, and the upper case character is made at the coding stage of the data entry device and not at the keyboard itself. This is expensive and hardly practical. It is the aim of the present invention to correct this drawback.

SUMMARY OF THE INVENTION

The keyboard according to the present invention consists of a number of keys. Each key corresponds at most with two characters, a first character termed an upper case character, and a second character termed a lower case character. The keyboard further includes a character selection device which makes it possible to select either the upper case character or the lower case character of a key. The keyboard also includes an electric circuit with an associated key transducer which sends a logical pulse to the input of a pulse generator when a key is activated. The pulse generator is also controlled by the above mentioned selection device, and sends simultaneously over n different channels n logical pulses corresponding with the character chosen by said selector.

DESCRIPTION OF THE DRAWINGS

The invention will be best understood from the following description and with reference to the attached drawings wherein.

DETAILED DESCRIPTION OF THE INVENTION

In the example which is now to be illustrated, the signals sent out by the keyboard are outputed selectively and simultaneously over two channels.

Figure 1:
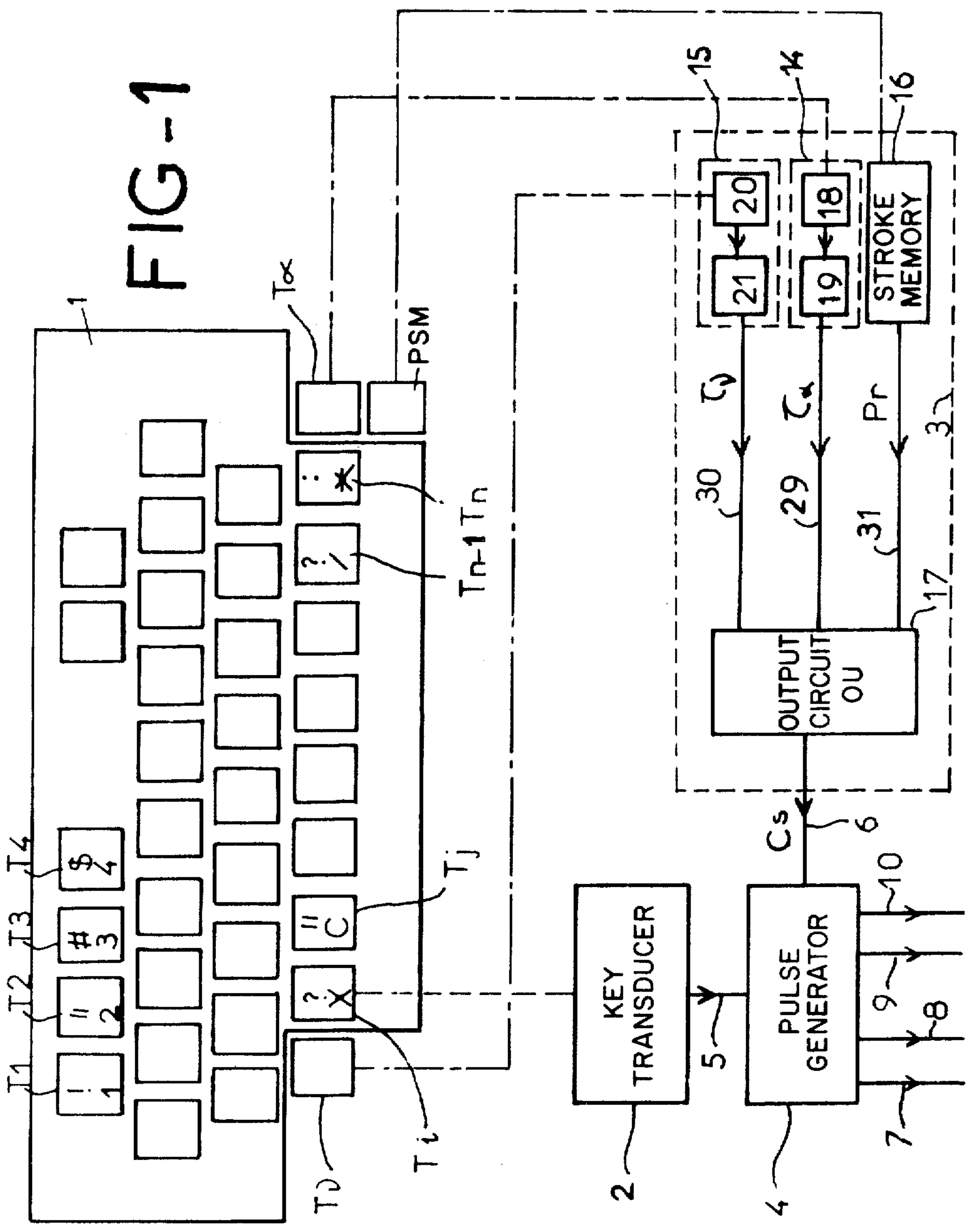
FIG. 1 shows the various component elements of a keyboard according to the invention.

When one refers to FIG. 1 one will see the various component elements of a keyboard according to the invention, namely:

the set of keys 1
the key transducer 2
the character selector 3
the pulse generator 4.

The set of keys 1 comprises n keys $T_1$, $T_2$, $T_3$ . . . $T_i$, $T_j$ . . . $T_n$. Each key represents at the most two different characters (or possibly functions), one being an upper case character (i.e. !, ", # ), the other being a lower case character (i.e. *x*, *c*, 1, 2, 3, 4). A key transducer 2 is affiliated with each key of the set of keys 1. When a key, such as $T_i$, is pressed down the key transducer 2 under the influence of this mechanical pressure action sends out a logical pulse $E_3$, via a first input 5 to the pulse generator 4. Simultaneously with the depression of the key $T_i$ the character selector 3 is set in motion by, on the one hand, manually actuated character selecting means comprising one or the other key $T_\alpha$ and $T_\nu$ or, on the other hand, by selecting program-selecting means PSM. When set in motion, the character selector 3 sends out an electrical signal $C_s$ that is conveyed via a second input 6 to the pulse generator 4. In response to the two signals $E_3$ and $C_s$, the generator 4 transmits two simultaneously occurring logical pulses either over the lines 7 and 8 (if a lower case character is selected) or over the lines 9 and 10 (if an upper case character is chosen). It is to be understood, however, that the number of output lines will be dictated by the requirements of the data processing system receiving the pulses from pulse generator 4. Although, in the example given, two output lines are provided for each case, in many applications one output line will be sufficient for each case.

Figure 2:
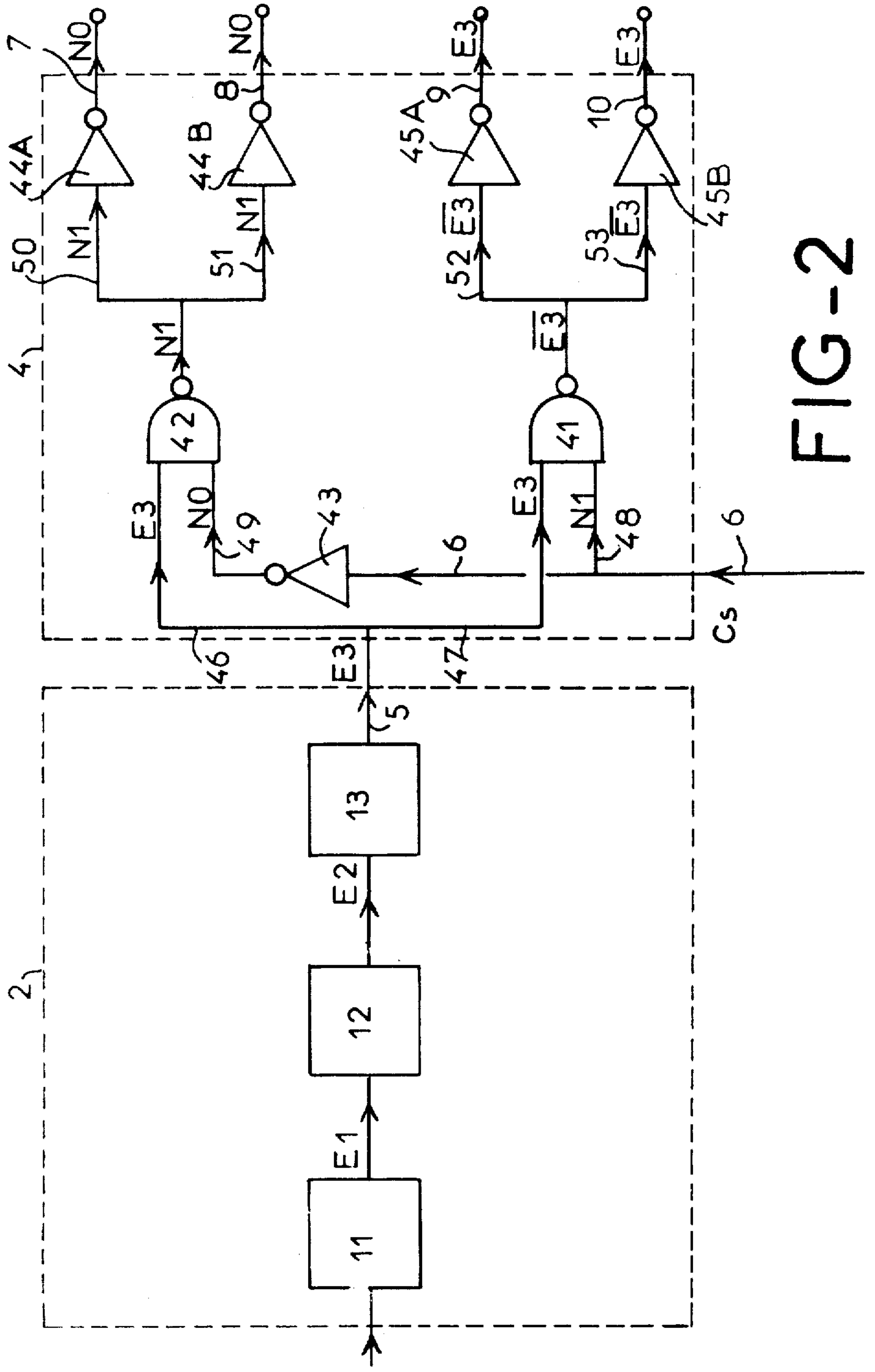
FIG. 2 is an electrical diagram representing the key transducer and the pulse generator.
Figures 3, 4:
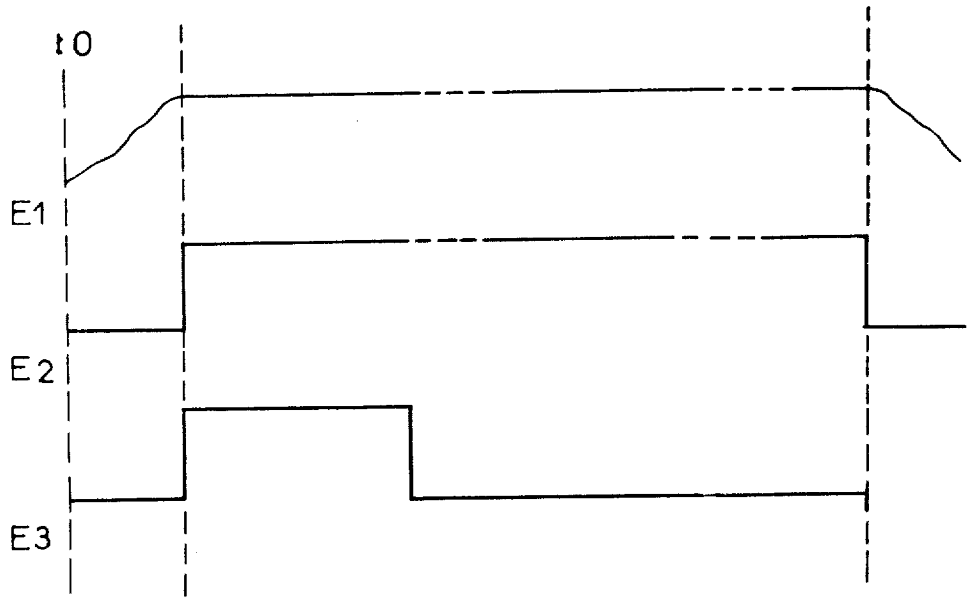
FIG. 3 exhibits various signals taken at different points within the key transducer.
FIG. 4 is a logic table showing the various combinations of signals within the character selector.

Referring to FIG. 2, the key transducer 2 is seen to include a Hall effect semiconductor 11, a Schmitt trigger circuit 12 and a monostable circuit 13. If one presses down on the key $T_i$, the Hall effect semiconductor 11, under the influence of the resultingly applied mechanical pressure, emits an electrical signal $E_1$ as shown in FIG. 3. The duration of the signal $E_1$ corresponds to the duration of the pressure on the key. FIG. 3 depicts the form of the three signals $E_1$, $E_2$, and $E_3$ wherein the moment $t_0$ represents the start of pressure on the key. The signal $E_1$ which is a logical level with a so called "weak" front is transmitted to the input of the Schmitt circuit trigger 12 which converts it into a signal $E_2$ that is a logic level with a so called "rigid" front that is roughly of the same duration as that of $E_1$. This signal $e_2$ is sent to the input of the monostable circuit 13 at whose output the logical pulse $E_3$ is obtained. The pulse $E_3$ is transmitted to the input of the pulse generator 4 by means of the line 5.

Returning now to FIG. 1, the character selector 3 begins with two special keys $T_\alpha$ and $T_\gamma$ for selecting lower case and upper case characters, respectively, and two special transducers 14 and 15, respectively affiliated with these two keys. The character selector 3 furthermore comprises a stroke memory 16 which stores a stroke program and an sorting circuit OU 17 with a logical table depicted in FIG. 4. Stroke memory 16 may comprise any conventional binary storage medium, such as a magnetic storage drum, which can store a string of binary bits, each having a logical one or a logical zero value. The stroke program is such a string of binary bits, each of which may select a lower or an upper case character, typical examples being given in column $P_r$ in the logical table of FIG. 4, and may be transferred to the storage medium of stroke memory 16 from a central processing unit of a data processing system as is well known in the art. In order to select signals from stroke memory 16, program selecting means PSM is provided, being shown symbolically as an additional special key adjacent to keyboard 1. Thus, the operator has two ways of selecting upper or lower case characters. A first way involves pressing one of the keys $T_\alpha$ and $T_\gamma$ simultaneously with one of the keys $T_i$. The second way involves actuation of the special key PSM which will actuate stroke memory 16 to provide the stroke program signal $P_r$ on line 31. With the stroke program actuated, the operator does not need to strike the keys $T_\alpha$ and $T_\gamma$ ; he need only strike $T_i$ keys.

The special transducers 14 and 15 are each seen to include respective Hall effect semiconductors 18, 20 and the Schmitt trigger circuits 19, 21. The Hall effect semiconductors 18 and 20 are identical to the Hall effect semiconductor 11 and the Schmitt triggers 19 and 21 are identical to the Schmitt trigger 12. The special key transducers 14 and 15 operate in the same manner as the part of transducer 2 which preceeds monostable circuit 13 and will therefore not be described in detail.

Figure 5:
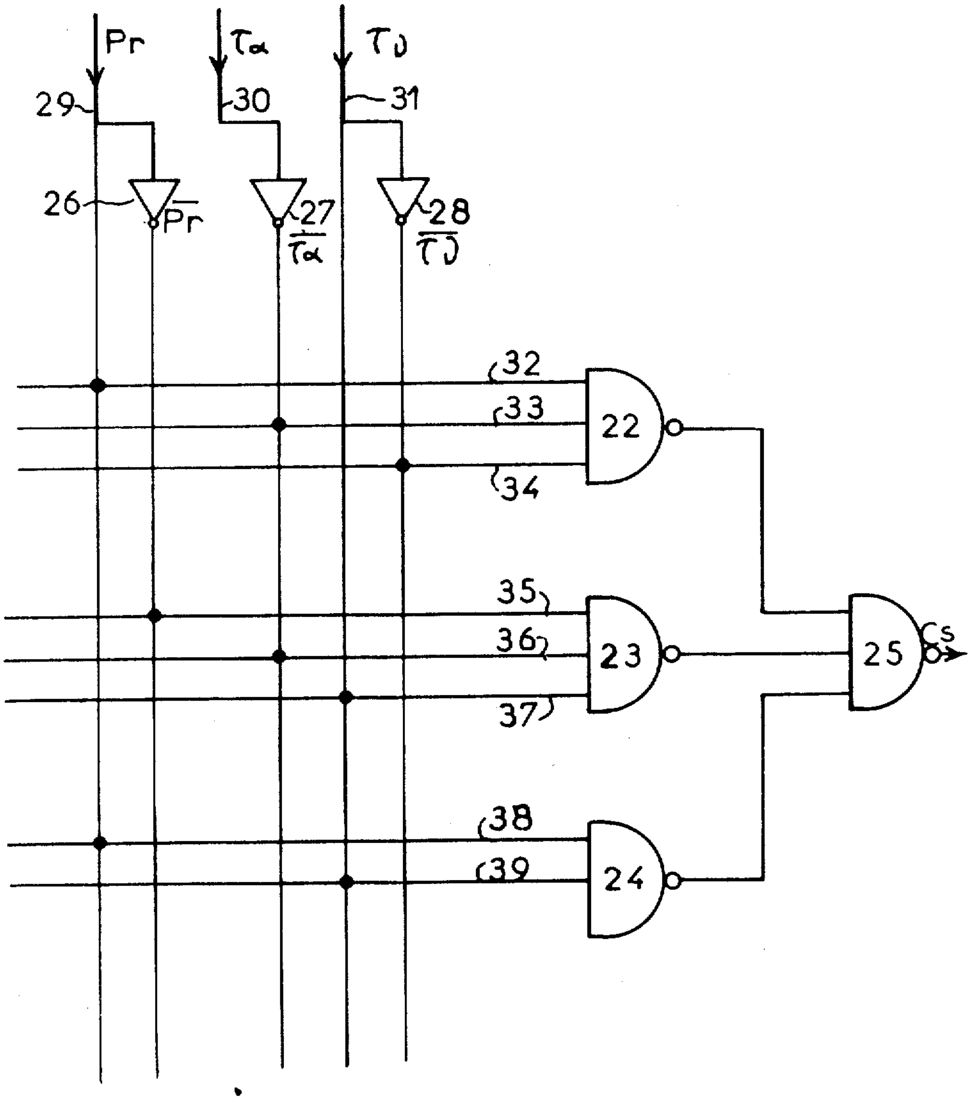
FIG. 5 is the diagram of the circuit OU permitting the application of the different signal combinations shown by the table of FIG. 4.

The sorting circuit OU 17 is shown in detail in FIG. 5 to include four logical NO-AND Circuits 22, 23, 24, 25 (more commonly called NAND gates according to the Anglo-Saxon terminology) and three inverter circuits 26, 27, 28.

The functioning of the character selector 3, and especially the sorting circuit OU 17, will now be described. First of all assume that $P_r$, $\tau_\alpha$ , $\tau_\gamma$ in FIG. 5 are the respective logical signals eminating from the memory 16 and the special transducers 14 and 15 over the lines 31, 29, and 30 to the input of the output circuit OU 17. FIG. 4 is a logic table reflecting the different values taken by the output signal $C_s$ as a function of the values which can be taken by the signals $P_r$, $\tau_\alpha$ and $\tau_\gamma$ . These values are seen to either be logical zero or logical one. The table of FIG. 4 is organized into horizontal rows A to H. This table reflects the conditions which the character selector 3 must meet as will be explained in detail below. It is first of all to be noted that the output signal $C_s$ of the character selector 3 is at a logical 1 level when an upper case character is selected and is at a logical zero level then a lower case character is selected. An upper case or a lower case character can be chosen in two different ways. The first way is to press one of the keys $T_\alpha$ or $T_\gamma$ simultaneously with the key $T_i$. This causes the affiliated transducer, 14 or 15 to emit a logical 1 signal for $\tau_\alpha$ or $\tau_\gamma$ . The logical 1 level of either $\tau_\alpha$ or $\tau_\gamma$ is seen to correspond to the high level of signal $E_2$. The signals $\tau_\alpha$ and $\tau_\gamma$ are seen to both be inputed to the sorting circuit OU 17. Referring to FIG. 4, in the execution sample here described, when $\tau_\alpha = 1$, $C_s = 0$ (row C) and when $\tau_\gamma = 1$, $C_s = 1$ (row D). When the two keys are at rest, $\tau_\alpha = \tau_\gamma = 0$, and $C_s = 0$ (row A) and everything occurs as if the lower case character has been chosen. A second way in which an upper or lower case character can be chosen is by way of the intermediary of a set of instructions supplied by a stroke program stored in the stroke memory 16. The latter emits a signal $P_r$ equal to a logical 1 as shown in row B (if the upper case character is selected by this program) and equal to the logical zero as shown in row A (if the lower case character is selected).

The aforementioned two ways of selecting upper or lower case characters are independent of each other. If they are chosen simultaneously the selection involving keys $T_\alpha$ or $T_\gamma$ has priority over the instructions of the stroke program. Thus, when in the course of the performance of a stroke program the need arises to modify one or several instructions it is sufficient to press down on one of the keys $T_\alpha$ or $T_\gamma$ . The corresponding signal $\tau_\alpha$ or $\tau_\gamma$ will be taken into consideration by the sorting circuit OU 17 (row E and F). In the case of the simultaneous pressing of the keys $T_\alpha$ and $T_\gamma$ two eventualities may occur: (a) available instructions supplied by the stroke program:then only the signal $P_r$ is taken into consideration by the output circuit OU 17 (row H, FIG. 4), (b) there are no instructions supplied by the stroke program: everything occurs as if the lower case character was chosen: the output signal $C_s$ is then equal to logical zero (row G).

The logical equation derived from the table of FIG. 4 which makes possible the expression of $C_s$ as a function of $P_r$, $\tau_\alpha$ and $\tau_\gamma$ is the following:

I. $C_s = \overline{P_r} \cdot \overline{\tau_\alpha} \cdot \overline{\tau_\gamma} + P_r \cdot \overline{\tau_\alpha} \cdot \tau_\gamma + P_r \cdot \overline{\tau_\alpha} \cdot \tau_\gamma + P_r \cdot \tau_\alpha \cdot \tau_\gamma$ or:

II. $C_s = P_r \cdot \overline{\tau_\alpha} \cdot \overline{\tau_\gamma} + \overline{P_r} \cdot \overline{\tau_\alpha} \cdot \tau_\gamma + P_r \cdot \tau_\gamma (\overline{\tau_\alpha} + \tau_\alpha)$ or:

III. $C_s = P_r \cdot \overline{\tau_\alpha} \cdot \overline{\tau_\gamma} + \overline{P_r} \cdot \overline{\tau_\alpha} \cdot \tau_\gamma + P_r \cdot \tau_\gamma$ .

By making use of the Pierce rule one may also write:

IV. $C_s = (P_r / \overline{\tau_\alpha} / \overline{\tau_\gamma}) / (\overline{P_r} / \overline{\tau_\alpha} / \tau_\gamma) / (P_r / \tau_\gamma)$.

The output circuit OU 17 permits the practical setting-up of this logical equation. This may clearly be seen in FIG. 5 wherein lines 29, 30, 31 are connected to the lines 32 to 39 as shown by the connection points. The lines 32 through 40 lead to the inputs of the NAND circuits 22, 23, 24 as shown. The pulse generator 4 comprises, as may be seen in FIG. 2, the NAND circuits 41 and 42, and the inverters 43, 44A and 44B, 45A and 45B.

The operation of the pulse generator 4 will now be described. It is supposed that the key $T_i$ is pressed down and that the character selector 3 has chosen the upper case character: one receives then at the input of the generator 4 a logical pulse $E_3$ is brought by the conductor 5 and a logical one signal $C_s$ is brought by the conductor 6 (see FIG. 2). For convenience a logical 1 level will be referred to as $N_1$ and a logical zero level will be referred to as $N_0$. The pulse $E_3$ is transmitted by the line 46 to the NAND circuit 42 and by the line 47 to the NAND circuit 41. The level $C_s = N_1$ is transmitted partly to the NAND circuit 41 by the line 48 and partly by the line 6 to the inverter 43 which transforms $N_1$ into a level $N_0 = \bar{N}_1$ which is transmitted by the line 49 to the NAND circuit 42. In summary, the inputs of the NAND circuit 42 are a pulse $E_3$ and a level $N_0$, and the inputs of the NAND circuit 41 are a pulse $E_3$ and a level $N_1$.

The NAND circuit 42 outputs a level $N_1$ which is transmitted to the inverters 44A and 44B, via the lines 50 and 51. The NAND circuit 41 outputs a pulse $\bar{E}_3$, the reverse of $E_3$, which is transmitted by the lines 52 and 53 to the inverters 45A and 45B. The inverters 44A and 45B output the level $N_0$ on the lines 7 and 8 and the inverters 45A and 45B output the pulse $E_3$ on the lines 9 and 10. The choice of a lower case character results in the generation of the pulses $E_3$ on the lines 7 and 8 and of the level $N_0$ on the lines 9 and 10.

What is claimed is:

1. An electronic keyboard, comprising a plurality of character keys, each associated with a lower case character and an upper case character; character key circuit means for each character key for providing a key signal when a corresponding character key is actuated; a lower case selector key; lower case circuit means for providing a binary signal $\tau_\alpha$ of a first level when said lower case selector key is actuated and of a second level when said lower case selector key is not actuated; an upper case character selector key; upper case circuit means for providing a binary signal $\tau_\gamma$ of said first level when said upper case selector key is actuated and of said second level when said upper case selector key is not actuated; automatic control means providing a signal $P_r$ as a string of binary signals having either said first level or said second level; means for actuating said automatic control means; and output selector circuit means for selecting said lower case character associated with said actuated character key when said signal $P_r$ is at said second level, said signal $\tau_\alpha$ is at said second level, and said signal $\tau_\gamma$ is at said second level, and for selecting said upper case character associated with said actuated character key when said signal $P_r$ is at said first level, said signal $\tau_\alpha$ is at said second level, and said signal $\tau_\gamma$ is at said second level.

2. An electronic keyboard according to claim 1, wherein said output selector circuit means selects said upper case character when said signal $P_r$ is at said second level, said signal $\tau_\alpha$ is at said second level and said signal $\tau_\gamma$ is at said first level.

3. An electronic keyboard according to claim 1, wherein said output selector circuit means selects said lower case character when said signal $P_r$ is at said first level, said signal $\tau_\alpha$ is at said first level, and said signal $\tau_\gamma$ is at said second level.

4. An electronic keyboard according to claim 1, wherein said output selector circuit means selects said lower case character when said signal $P_r$ is at said second level, said signal $\tau_\alpha$ is at said first level, and said signal $\tau_\gamma$ is at said first level.

5. An electronic keyboard according to claim 1, wherein output selector circuit means selects said upper case character when said signal $P_r$ is at said first level, said signal $\tau_\alpha$ is at said first level, and said signal $\tau_\gamma$ is at said first level.

6. An electronic keyboard according to claim 1, wherein said character key circuit means comprises a key tranducer including in series a Hall effect semiconductor, a Schmitt trigger circuit, and a monostable circuit providing a pulse as said key signal.

7. An electronic keyboard according to claim 1, wherein said lower case circuit means comprises a key transducer including in series a Hall effect semiconductor, a Schmitt trigger circuit, and a monostable circuit providing said binary signal.

8. An electronic keyboard according to claim 1, wherein said upper case circuit means comprises a key tranducer including a Hall effect semiconductor, a Schmitt trigger circuit, and a monostable circuit providing said binary signal.

9. An electronic keyboard according to claim 1, wherein said output selector circuit means comprises a first NAND gate, a second NAND gate a third NAND gate, and a fourth NAND gate, means connecting said signal $P_r$ to an input of said first NAND gate and an input of said third NAND gate, means connecting the inverse of said signal $P_r$ to an input of said second NAND gate, means connecting the inverse said signal $\tau_\alpha$ to an input of said first NAND gate and an input of said second NAND gate, means connecting said signal $\tau_\gamma$ to an input of said second NAND gate and an input of said third NAND gate, means connecting the inverse of said signal $\tau_\gamma$ to an input of said first NAND gate, and means connecting the outputs of said first, second and third NAND gates to respective inputs of said fourth NAND gate, said fourth NAND gate providing a selection control signal $C_s$ on its output, said signal $C_s$ being at said first level for selecting said upper case character and at said second level for selecting said lower case character.

10. An electronic keyboard is recited in claim 9, wherein said output selector circuit means comprises an output circuit for receiving said key signal from said character key circuit means and means responsive to said signal $C_s$ for providing upper case character signals on a first output channel when said signal $C_s$ is at said first level and lower case character signals on a second output channel when said signal $C_s$ is at said second level.

11. An electronic keyboard as recited in claim 1, wherein said output selector circuit means comprises an output circuit for receiving said key signal from said character key circuit means, means responsive to said signals $P_r$, $\tau_\alpha$ and $\tau_\gamma$ providing a character selector signals $C_s$, and means responsive to said signal $C_s$ for providing upper case character signals on a first output channel when said signal $C_s$ is at a particular level end lower case character signals in a second output channel when said signal $C_s$ is at another level.

12. An electronic keyboard according to claim 1, wherein said output selector circuit means selects said lower case character when said $P_r$ is at said second level, said signal $\tau_\alpha$ is at said first level, and said signal $\tau_\gamma$ is at said second level, for selecting said upper case character when said signal $P_r$ is at said second level, said signal $\tau_\alpha$ is at said second level, and said signal $\tau_\gamma$ is at said first level, for selecting said lower case character when said signal $P_r$ is at said first level, said signal $\tau_\alpha$ is at said first level, and said signal $\tau_\gamma$ is at said second level, for selecting said upper case character when said signal $P_r$ is at said first level, said signal $\tau_\alpha$ is at said second level, and signal $\tau_\gamma$ is at said first level, for selecting said lower case character when said signal $P_r$ is at said seond level, said signal $\tau_\alpha$ is at said first level, and said signal $\tau_\gamma$ is at said first level, and for selecting said upper case character when said signal $P_r$ is at said first level, said signal $\tau_\alpha$ is at said first level, and said signal $\tau_\gamma$ is at said first level.

* * * * *